June 21, 1960    W. E. ROAKE ET AL    2,941,933
FUEL ELEMENT FOR NUCLEAR REACTOR
Filed Nov. 30, 1959
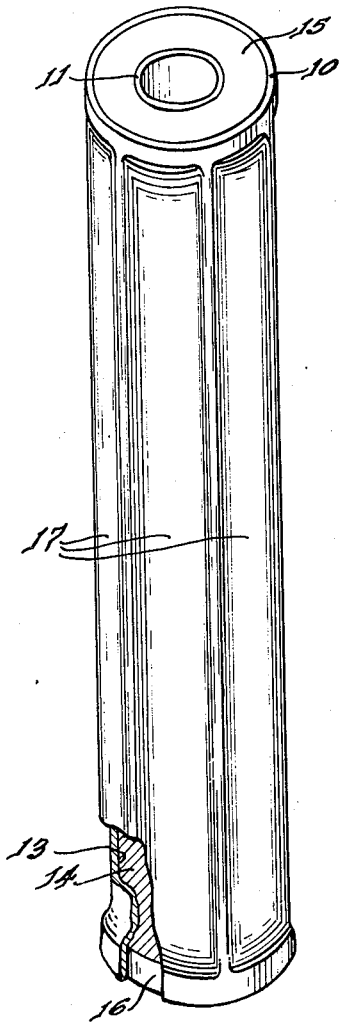
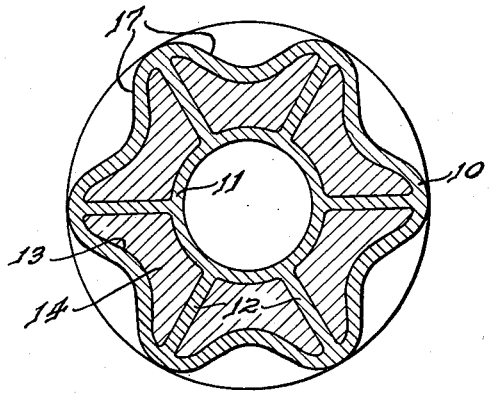
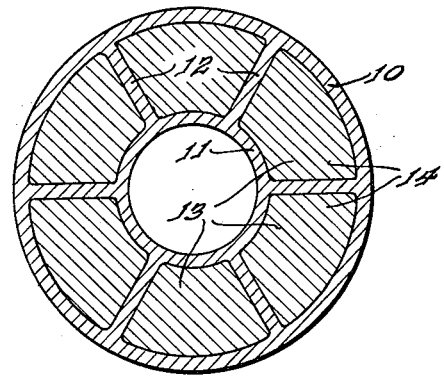
INVENTORS
William E. Roake
Ersel A. Evans
Daniel W. Brite
By:
Attorney ly cooled fuel element consisting of two coaxial tubes
2,941,933

FUEL ELEMENT FOR NUCLEAR REACTOR

William E. Roake, Ersel A. Evans, and Daniel W. Brite, Richland, Wash., assignors to the United States of America as represented by the United States Atomic Energy Commission Filed Nov. 30, 1959, Ser. No. 856,322

1 Claim. (Cl. 204—154.2)

This invention relates to a method of preparing a fuel element for a nuclear reactor. In more detail the invention relates to the formation of ceramic fuel elements in which a powdered fuel is compacted simultaneously to formation of the cladding. The invention is particularly useful in reactors capable of using a uranium oxide fuel enriched with plutonium oxide.

It is an object of the present invention to develop a method of preparing a fuel element incorporating a powdered fuel which is particularly adaptable to remote operation technology.

It is a further object of the present invention to develop a method of forming a fuel element incorporating a powdered fuel in which conventional methods of compacting the powder are not required.

These and other objects of the present invention are attained by isostatic pressing an internally and externally cooled fuel element consisting of two coaxial tubes having a plurality of integral radial ribs extending between the tubes and containing a powdered fuel material to form our novel fuel element.

The invention will next be described in connection with the accompanying drawings wherein:

Fig. 1 is a perspective view, partly broken away, of a fuel element constructed according to the present invention;

Fig. 2 is a cross-sectional view taken on the lines A—A in Fig. 1; and

Fig. 3 is a cross-sectional view of the fuel element at the same location before it is subjected to isostatic pressure.

As shown in the drawings our novel fuel element comprises two coaxial tubes of which tube 10 is the outer and tube 11 is the inner. These tubes form the cladding for the fuel element and may be aluminum or an aluminum alloy or other material conventionally employed for the purpose. Tubes 10 and 11 have a plurality of integral radial ribs 12 extending therebetween and defining a plurality of fuel compartments 13. Fuel compartments 13 contain a nuclear fuel material 14 which is initially placed therein in the form of a powder. Annular end caps 15 and 16 are provided at the ends of the fuel element to completely enclose the fuel material while permitting coolant to flow through the fuel element. Outer tube 10 contains depressed areas 17 therein extending between ribs 12 and end caps 15 and 16. These depressions give the element the appearance of a fluted column.

Formation of a specific test element constructed according to the present invention will next be described. The fuel element is constructed from cladding stock consisting of an extruded nickel-aluminum alloy shape in the form of two coaxial tubes 10 and 11 which are joined by six integral, equally-spaced, radial ribs 12. A nine-inch section was cut and the annular space between inner and outer tubes 10 and 11 was closed at one end of the section with a nickel-aluminum alloy cap 16 by fusion welding. The six fuel compartments 13 were then filled with equal quantities of uranium dioxide powder enriched in $U^{235}$ to 2.4% and packed to the relatively low bulk density of about 40% of theoretical crystal density. The total weight of $UO_2$ added was 640 gms.

End cap 15 of the same alloy was then inserted into the open end of the fuel assembly and the assembly was sealed by fusion welding after evacuation and refilling with helium. The hermetically sealed assembly was vibrated randomly to equalize the powder distribution and then subjected to pressure in an isostatic press. It was found desirable to apply the gas pressure slowly so as not to cause movement of the powder in directions other than radial. Accordingly the test element was first subjected to an external gas pressure of about 1000 p.s.i. This step immobilizes the uniformly distributed powder. Final pressing was accomplished by exposure in an hydraulic cylinder to 50,000 p.s.i. Outer tube 10 is thereby collapsed inwardly between the ribs 12 forming the depressions 17 so that the element takes the shape shown in cross-section in Fig. 2. Depressions 17 serve as external coolant channels for the fuel element. This procedure simultaneously compacts the $UO_2$ powder in the fuel compartments 13. The density of the $UO_2$ after compacting was found to be approximately 7 gms./cm.$^3$ which is about 65% of crystal density.

The fuel element was tested in the materials testing reactor to an exposure greater than $1.3 \times 10^{20}$ nvt. Performance was satisfactory in all respects. At a heat generation rate greater than 15 kilowatts per pound $UO_2$ the expected $UO_2$ sintering occurred, indicating core temperatures greater than 1400° C. No evidence was observed of reaction between the $UO_2$ and the cladding, demonstrating the efficiency of the internal aluminum ribs as heat conductors.

The article described and the method of preparing it have many advantages. First, the fuel element is of single piece construction and has a high surface-to-volume ratio by virtue of the depressions 17 in the outer tubes 10 of the fuel element. Also the $UO_2$ powder in the fuel element is compacted at the same time and by the same operation that forms the fuel element into the desired shape. Further, the internal ribs provide heat removal paths from the center of the fuel and serve to guide the uniform deformation of the outer wall 10 to provide the external coolant channels. And finally the process lends itself very well to fuel elements where remote handling is necessary such as a fuel element containing $UO_2$ enriched with plutonium.

Although the invention has been described in detail as applied to uranium dioxide as the fuel material, it applies equally well to any powdered ceramic, cermet, or powdered metal fuel used for fission, breeding, or control purposes in a nuclear reactor.

It will be understood that this invention is not to be limited to the details given herein but that it may be modified within the scope of the appended claim.

What is claimed is:

A method of preparing a fuel element for a nuclear reactor comprising extruding an aluminum shape consisting of two coaxial tubes having six equally-spaced radial ribs extending between the tubes, cutting the extruded shape to the desired length, capping the annular space between tubes at one end, filling the annular space between tubes with powdered uranium dioxide, capping the annular space between tubes at the other end, randomly vibrating the assembly to equalize the powder distribution, isostatically pressing the assembly at about 1000 p.s.i. to immobilize the uniformly distributed powder, and isostatically pressing the assembly at about 50,000 p.s.i. to collapse the outer tube between the ribs against the uranium dioxide powder thereby forming external coolant channels and simultaneously compacting the powder.

No references cited.